United States Patent
Cannon et al.

(10) Patent No.: US 8,554,744 B2
(45) Date of Patent: *Oct. 8, 2013

(54) ELIMINATION OF REDUNDANT OBJECTS IN STORAGE SYSTEMS

(75) Inventors: David M. Cannon, Tucson, AZ (US); Colin S. Dawson, Tucson, AZ (US); Robert C. Edwards, Jr., Susquehanna, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,777

(22) Filed: Apr. 22, 2011

(65) Prior Publication Data

US 2011/0196845 A1    Aug. 11, 2011

Related U.S. Application Data

(63) Continuation of application No. 12/140,931, filed on Jun. 17, 2008, now Pat. No. 7,958,152, which is a continuation of application No. 11/206,467, filed on Aug. 17, 2005, now Pat. No. 7,403,949.

(51) Int. Cl.
*G06F 17/30* (2006.01)

(52) U.S. Cl.
USPC .......................................... 707/692; 707/802

(58) Field of Classification Search
CPC ................ G06F 17/30067; G06F 17/30489; G06F 3/0641
USPC ........................ 707/778, 802, 999.101, 692
See application file for complete search history.

(56) References Cited

U.S. PATENT DOCUMENTS

| 4,007,450 A | * | 2/1977 | Haibt et al. | 709/226 |
| 5,627,990 A | | 5/1997 | Cord et al. | |
| 5,644,706 A | * | 7/1997 | Ruigrok et al. | 714/48 |
| 5,644,766 A | | 7/1997 | Coy et al. | |

(Continued)

FOREIGN PATENT DOCUMENTS

WO    0195140    12/2001

OTHER PUBLICATIONS

Wikipedia, the free encyclopedia, "Single-Instance Storage", 2012, 2 pages, accessed online at <http://en.wikipedia.org/wiki/Single-instance_storage> on Apr. 26, 2012.*

(Continued)

*Primary Examiner* — Phuong Thao Cao
(74) *Attorney, Agent, or Firm* — Rabindranath Dutta; Konrad, Raynes, Davda & Victor LLP

(57) ABSTRACT

Provided are a method, system, and article of manufacture, wherein a data structure corresponding to a set of client nodes selected from a plurality of client nodes is generated. Objects from the selected set of client nodes are stored in the data structure. A determination is made that an object corresponding to a client node of the selected set of client nodes has to be stored. An additional determination is made as to whether the object has already been stored in the data structure by any client node of the selected set of client nodes. The object is stored in the data structure, in response to determining that the object has not already been stored in the data structure by any client node of the selected set of client nodes.

17 Claims, 10 Drawing Sheets

(56) References Cited

U.S. PATENT DOCUMENTS

| | | | |
|---|---|---|---|
| 5,729,743 A | 3/1998 | Squibb | |
| 5,732,265 A | 3/1998 | Dewitt et al. | |
| 5,778,395 A * | 7/1998 | Whiting et al. | 1/1 |
| 5,813,008 A * | 9/1998 | Benson et al. | 1/1 |
| 6,144,965 A * | 11/2000 | Oliver | 1/1 |
| 6,336,115 B1 * | 1/2002 | Tominaga et al. | 1/1 |
| 6,389,433 B1 * | 5/2002 | Bolosky et al. | 707/749 |
| 6,477,544 B1 * | 11/2002 | Bolosky et al. | 1/1 |
| 6,498,483 B1 * | 12/2002 | Hirano et al. | 324/248 |
| 6,513,051 B1 * | 1/2003 | Bolosky et al. | 1/1 |
| 6,584,497 B1 | 6/2003 | Case et al. | |
| 6,608,895 B1 * | 8/2003 | Avidan | 379/355.01 |
| 6,615,225 B1 | 9/2003 | Cannon et al. | |
| 6,629,112 B1 * | 9/2003 | Shank et al. | 1/1 |
| 6,829,637 B2 | 12/2004 | Kokku et al. | |
| 6,857,053 B2 | 2/2005 | Bolik et al. | |
| 6,901,413 B1 * | 5/2005 | Wu | 707/692 |
| 6,952,737 B1 * | 10/2005 | Coates et al. | 709/229 |
| 6,970,872 B1 | 11/2005 | Chandrasekaran et al. | |
| 7,200,604 B2 * | 4/2007 | Forman et al. | 707/692 |
| 7,246,275 B2 | 7/2007 | Therrien et al. | |
| 7,266,555 B1 * | 9/2007 | Coates et al. | 707/827 |
| 7,266,556 B1 * | 9/2007 | Coates | 1/1 |
| 7,281,168 B1 * | 10/2007 | Coates et al. | 714/43 |
| 7,310,644 B2 * | 12/2007 | Adya et al. | 1/1 |
| 7,325,094 B2 * | 1/2008 | Murahashi et al. | 711/112 |
| 7,590,747 B2 * | 9/2009 | Coates et al. | 709/229 |
| 7,610,291 B2 | 10/2009 | Cannon et al. | |
| 7,747,577 B2 | 6/2010 | Cannon et al. | |
| 7,761,425 B1 * | 7/2010 | Erickson et al. | 707/649 |
| 7,882,064 B2 * | 2/2011 | Lee et al. | 707/625 |
| 7,913,053 B1 * | 3/2011 | Newland | 711/172 |
| 7,949,662 B2 * | 5/2011 | Farber et al. | 707/747 |
| 8,073,822 B2 * | 12/2011 | Sell et al. | 707/692 |
| 2001/0047400 A1 * | 11/2001 | Coates et al. | 709/219 |
| 2002/0112008 A1 * | 8/2002 | Christenson et al. | 709/206 |
| 2002/0165911 A1 | 11/2002 | Gabber et al. | |
| 2003/0037022 A1 * | 2/2003 | Adya et al. | 707/1 |
| 2003/0040839 A1 * | 2/2003 | Sabe et al. | 700/245 |
| 2003/0105716 A1 * | 6/2003 | Sutton et al. | 705/50 |
| 2003/0110190 A1 * | 6/2003 | Achiwa et al. | 707/203 |
| 2003/0110264 A1 | 6/2003 | Whidby et al. | |
| 2003/0126136 A1 * | 7/2003 | Omoigui | 707/10 |
| 2003/0135566 A1 * | 7/2003 | Nishiguchi et al. | 709/206 |
| 2003/0191783 A1 * | 10/2003 | Wolczko et al. | 707/206 |
| 2004/0019898 A1 * | 1/2004 | Frey et al. | 719/330 |
| 2004/0088382 A1 | 5/2004 | Therrien et al. | |
| 2004/0199521 A1 * | 10/2004 | Anglin et al. | 707/100 |
| 2004/0199556 A1 * | 10/2004 | Garthwaite | 707/206 |
| 2004/0227962 A1 | 11/2004 | Xia | |
| 2004/0229688 A1 * | 11/2004 | Potter et al. | 463/30 |
| 2005/0086258 A1 * | 4/2005 | Murahashi et al. | 707/104.1 |
| 2005/0183094 A1 * | 8/2005 | Hunt | 719/315 |
| 2005/0246393 A1 * | 11/2005 | Coates et al. | 707/200 |
| 2006/0083442 A1 * | 4/2006 | Loukipoudis et al. | 382/305 |
| 2006/0235821 A1 * | 10/2006 | Armangau et al. | 707/1 |
| 2007/0038610 A1 * | 2/2007 | Omoigui | 707/3 |

OTHER PUBLICATIONS

Wikipedia, the free encyclopedia, "Data Deduplication", 2012, 6 pages, accessed online at <http://en.wikipedia.org/wiki/Data_deduplication> on Apr. 26, 2012.*

Bolosky et al., "Single Instance Storage in Windows 2000", in the Proceedings of the 4th USENIX Windows Systems Symposium Paper, 2000, 12 pages, accessed online at <http://research.microsoft.com/pubs/74261/wss2000.pdf> on Sep. 28, 2012.*

J.D Jones et al., "Checking Scheme for Compares in a Queuing System", IM Corporation, Technical Disclosure Bulletin. vol. 19, No. 2, Jul. 1976, pp. 591-593.

Office Action 1 for U.S. Appl. No. 11/206,467, dated Sep. 27, 2007, 8 pp.

Notice of Allowance for U.S. Appl. No. 11/206,467, dated Mar. 18, 2008, 5 pgs.

Response to Office Action 1 for U.S. Appl. No. 11/206,467, dated Dec. 27, 2007, 14 pp.

Response after Notice of Allowance for U.S. Appl. No. 11/206,467, dated Jun. 11, 2008, 5 pp.

Response after Notice of Allowance for U.S. Appl. No. 11/206,467, dated Jun. 13, 2008, 6 pp.

Notice of Allowance for U.S. Appl. No. 12/140,931, dated Oct. 14, 2010, 8 pgs.

Second Notice of Allowance for U.S. Appl. No. 12/140,931, dated Jan. 27, 2011, 10 pgs.

* cited by examiner

ELIMINATION OF REDUNDANT OBJECTS IN STORAGE SYSTEMS

CROSS-REFERENCE TO RELATED APPLICATIONS

This application is a continuation of application Ser. No. 12/140,931 filed on Jun. 17, 2008 and issued as U.S. Pat. No. 7,958,152 on Jun. 7, 2011, which is incorporated herein by reference in its entirety.

application Ser. No. 12/140,931 is a continuation of application Ser. No. 11/206,467 filed on Aug. 17, 2005 and issued as U.S. Pat. No. 7,403,949 on Jul. 22, 2008, which is incorporated herein by reference in its entirety.

BACKGROUND

1. Field

The disclosure relates to a method, system, and article of manufacture for the elimination of redundant objects in storage systems.

2. Background

A storage management application, such as IBM* Tivoli* Storage Manager* (TSM), may be implemented on a storage management server. The storage management application may manage storage requirements for a plurality of client nodes that are coupled to the storage management server via a network.

* IBM, Tivoli, and Tivoli Storage Manager are trademarks or registered trademarks of IBM Corporation.

The storage management application may create and manage a repository for data and programs that are backed up, archived, migrated, or otherwise copied from the client nodes to the storage management server. The storage management server may store data objects, such as files, in one or more storage pools and may use a database stored in the storage management server for tracking information about the stored data objects.

The storage management application may perform incremental backup, incremental archiving, migration, or incremental copying of data from the client nodes to the storage management server. For example, if the storage management application comprises a backup application then the backup application may perform incremental backup operations in which files are backed up only if the files have changed since a previous, periodic full backup, where the periodic full backups may be made on a weekly, monthly or some other periodic basis. TSM extends incremental backup by using a "progressive incremental backup" in which objects are backed up once and then never backed up again unless the objects undergo modifications on a client node. The progressive incremental approach for backups, archiving, or copying of data, etc., may reduce the amount of data that has to be copied or moved to the storage management server from the client nodes, and can reduce network traffic and storage space requirements over the incremental approach for backups, archiving, or copying of data. The progressive incremental backup approach may use a database that tracks information about every stored object and the location at which each object is stored.

In certain computing environments, different client nodes may store the same files in the storage management server. For example, client nodes may have the same operating system files or different people working on the same project may store the same document locally on different client nodes. The storage of the same data object in different client nodes may introduce redundancy for backups, archiving, migration, copying, etc., by backing up and storing the same files from different client nodes on the storage management server, and may lead to inefficiencies even in systems using the progressive incremental approach or certain other approaches.

SUMMARY OF THE DESCRIBED EMBODIMENTS

Provided are a method, system, and article of manufacture, wherein a data structure corresponding to a set of client nodes selected from a plurality of client nodes is generated. Objects from the selected set of client nodes are stored in the data structure. A determination is made that an object corresponding to a client node of the selected set of client nodes has to be stored. An additional determination is made as to whether the object has already been stored in the data structure by any client node of the selected set of client nodes. The object is stored in the data structure, in response to determining that the object has not already been stored in the data structure by any client node of the selected set of client nodes.

In certain embodiments, the plurality of client nodes and the server node are computational devices, wherein the selected set of client nodes share common objects that are stored in the data structure.

In additional embodiments, database entries are stored for the objects stored in the data structure corresponding to the selected set of client nodes, wherein the database entries include metadata corresponding to the objects. Insertion time for the objects and the number of client nodes that reference the objects are included in the metadata.

In yet additional embodiments, a request to delete one object is received from one client. A pointer is dereferenced to the one object stored in the data structure, wherein the pointer is associated with inventory entries specific to the one client. The number of client nodes that references the one object is decremented. The one object is deleted from the data structure, in response to determining that no client nodes reference the one object.

In further embodiments, the number of objects stored in the data structure are limited based on insertion times for the objects and the number of client nodes that reference the objects.

In still further embodiments, the server node and the set of client nodes can communicate in a client server environment and in a peer to peer environment, wherein redundant files are eliminated by storing common objects of the set of client nodes in the data structure generated on the server node.

BRIEF DESCRIPTION OF THE DRAWINGS

Referring now to the drawings in which like reference numbers represent corresponding parts throughout.

DETAILED DESCRIPTION

Figure 1:
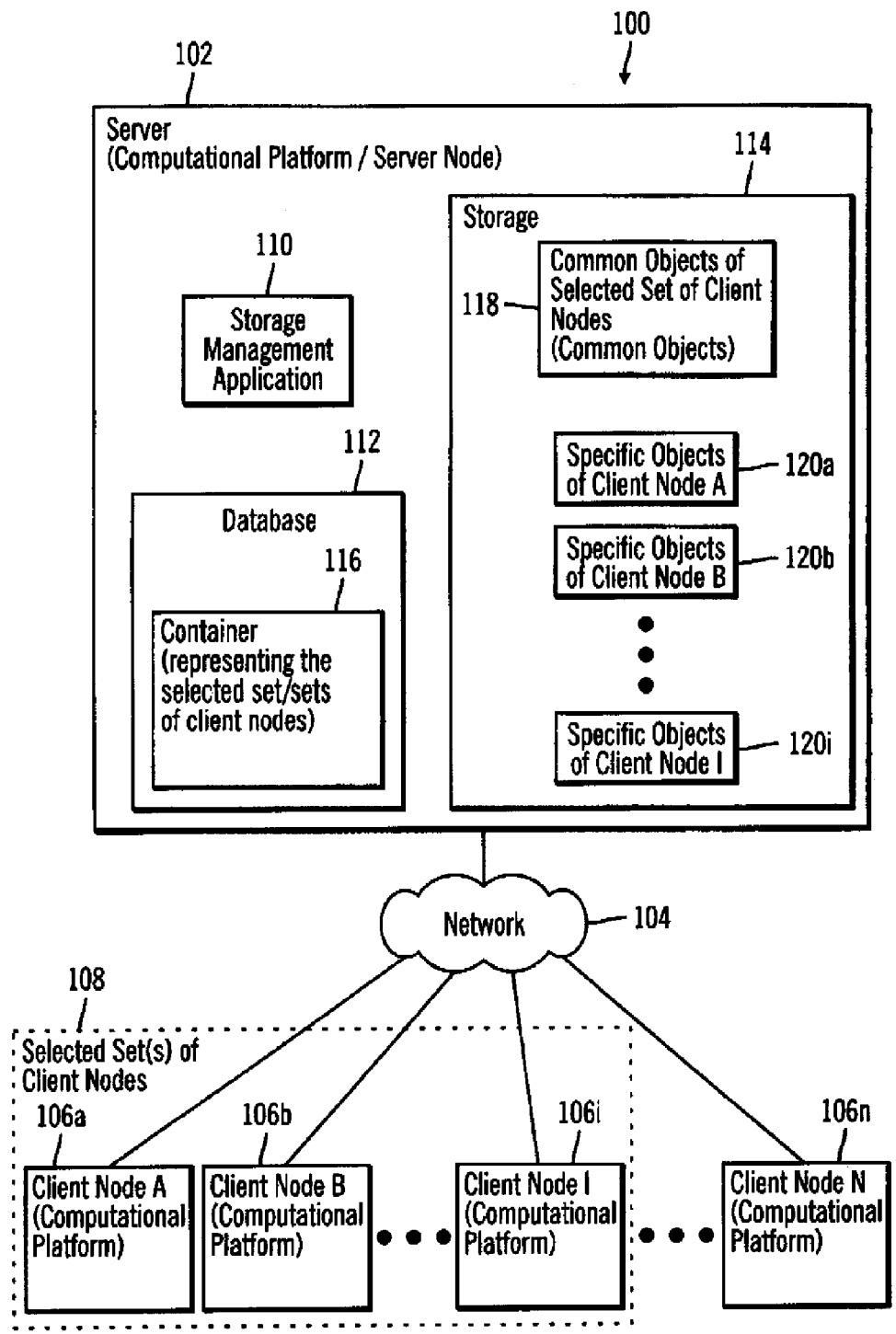
FIG. 1 illustrates a block diagram of a computing environment in accordance with certain embodiments.

In the following description, reference is made to the accompanying drawings which form a part hereof and which illustrate several embodiments. It is understood that other embodiments may be utilized and structural and operational changes may be made. For example, while the following description describes embodiments with reference to a backup of data, it is understood that alternative embodiments may be utilized for archiving of data, migration of data, etc.

Redundant Objects in Storage Management Systems

Certain storage management applications reduce redundancy by recognizing objects that have previously been backed up by other client nodes and by not backing up multiple instances of the same object from a plurality of client nodes. While such an approach may reduce redundancy, extensive processing may be required to determine whether a particular object has already been backed up by any other client node.

Certain storage management applications select a model node from a plurality of client nodes, where the model node manages which objects are common or candidates for being redundant for a plurality of other client nodes. Before a client node backs up an object to a server, the client node checks to determine whether the model node has already backed up the object to the server. As a result, redundant objects may be reduced on the server.

If a model node is maintained, then an object may not be considered redundant if the object is not found in the model node. For example, consider an enterprise with 10,000 employees with a first node labeled FRED that corresponds to data handled by an employee named Fred and a second node labeled JOE that corresponds to data handled by an employee named Joe, where the enterprise also has a model node named MODEL_A. In such a case, objects backed up by node MODEL_A may become the candidate objects that can be eliminated from backups by nodes FRED and JOE. However, nodes FRED and JOE may be used on the same project and may have a common set of objects between them that are the same. If there is a single model node MODEL_A, then while backing up data FRED and JOE would not have the common set of objects eliminated from the backup if the common set of objects were not backed up by the node MODEL_A. For an enterprise with 10,000 employees it may not always be desirable to have MODEL_A backup the objects that would be common to FRED and JOE because the objects that are common to nodes FRED and JOE may not be considered relevant across the 10,000 employees of the enterprise.

Certain embodiments, do not use a dedicated model node that is used to declare those objects that are considered to be candidates for redundant object elimination, but instead use a selected set of client nodes that may be referred to as an "adaptive model node". The adaptive model node looks at relationships between end-user nodes and the objects being populated to a backup server by these end-user nodes and dynamically determines redundancy between the objects.

Elimination of Redundant Objects

FIG. 1 illustrates a block diagram of a computing environment 100 in accordance with certain embodiments. At least one computational platform 102, where in certain embodiments the computational platform 102 may comprise a server, is coupled via a network 104 to a plurality of computational platforms 106*a*, 106*b*, . . . , 106*i*, . . . , 106*n*, where in certain embodiments the plurality of computational platforms 106*a* . . . 106*n* may comprise client nodes. While FIG. 1 indicates the computational platform 102 to be a server, and the computational platforms 106*a* . . . 106*n* to be client nodes, in alternative embodiments the computational platforms 102, 106*a* . . . 106*n* may comprise any suitable computational platform, including those presently known in the art, such as personal computers, workstations, mainframes, midrange computers, network appliances, laptop computers, telephony devices, blade computers, hand held computers, etc. The server 102 may also be referred to as a server node and the client nodes 106*a* . . . 106*n* may also be referred to as clients. Alternative embodiments may be implemented in a computing environment that is not based on a client-server paradigm. For example alternative embodiments may be implemented in a peer-to-peer networked environment.

In certain embodiments, a group of selected client nodes, such as client nodes 106*a* . . . 106*i*, is designated as a selected set of client nodes 108. While FIG. 1 shows client nodes 106*a* . . . 106*i* as being designated as the selected set of client nodes 108, in alternative embodiments the selected set of client nodes 108 may be comprised of different client nodes than those indicated in FIG. 1. In certain embodiments, there may be a plurality of different selected sets of client nodes 108.

The selected set of client nodes 108 may be selected via a computer program or may be designated by a user. The selected set of client nodes 108 may be selected according to a criterion such that objects are more likely to be shared among the selected set of client nodes 108, than between the selected set of client nodes 108 and other client nodes, such as client node 106*n*. The selected set of client nodes 108 is a derived representation of the client nodes 106*a* . . . 106*i* and may be a namespace representing the unique objects, such as file names, stored by all members of the selected set of client nodes 108.

The coupling of the server 102 to the client nodes 106*a* . . . 106*n* may be direct or may be via any network 104 known in the art, such as a Storage Area Network (SAN), Local Area Network (LAN), Wide Area Network (WAN), the Internet, an Intranet, etc.

A storage management application 110, a database 112, and a storage 114 may be coupled to the server 102. While FIG. 1 shows the storage 114 to be inside the server, in certain embodiments, the storage 114 may be external to the server 102 and may comprise storage units that are coupled to the server via a network. For the purposes of the application, the server 102, also referred to as a server node 102, may be considered to encompass the storage 114 whether or not the storage 114 is internal or external to the server 102. In certain embodiments, the server 102 may be used for backup processing. In other embodiments, the server 102 may be used for archiving, migration or copying of data. The database 112 may be external or internal to the server 102. The database 112 may include one or more containers 116 or any other data structure that represents the one or more selected sets of client nodes 108. For example, there may be different containers of client nodes for different projects. The containers 116 may be implemented as a list or any other suitable data structure.

The storage 114 includes a data structure of named common objects 118 that represents common objects of the selected set of client nodes 108. In addition, the storage 114 also includes data structures representing specific objects of client nodes 120a, 120b, . . . 120i corresponding to the client nodes 106a, 106b, . . . 106i respectively.

The storage management application 110 may allow some or all objects from the selected set of client nodes 108 to be backed up to the storage 114 and stored as the common objects 118 of the selected set of client nodes 108. Similarly, the storage management application 108 may also allow certain objects from the client nodes 106a . . . 106i to be backed up to the storage 114 and stored as the specific objects of client nodes 120a . . . 120i. For example, the actual data of the objects from client node 106b that are not in the common objects 118 of the selected set of client nodes 108 may be backed up in the storage 114 as the specific objects of client node 120b. The common objects 118 may comprise objects that are shared among the selected set of client nodes 108. Various mechanisms may be used to determine whether an object that is to be backed up by a client node has already been stored as a common object. For example, in certain embodiments a checksum may be computed for an object to be backed up and compared with a checksum for the common object to determine whether an object to be backed up has possibly been already stored on the server 102. In addition to comparing the checksum, additional or alternative checks may be performed to determine whether an object to be backed up by a client has already been stored as a common object on the server 102.

The database 112 includes an inventory with entries corresponding to common objects 118 of selected sets of client nodes and the specific objects 120a . . . 120i corresponding to the selected set of client nodes 108. The storage management application 110 may query the database 112 for inventory information corresponding to one or more objects of any client node 106a . . . 106i.

Therefore, FIG. 1 illustrates certain embodiments in which the storage management application 110 allows the selected set of client nodes 108 to be represented by a container 116 in the server 102. In response to a request from a client node, such as client node 106b that belongs to the set of client nodes 108, to backup an object to the storage 114, the storage management application 110 determines whether the object has already been stored in the common objects 118 of the selected set of client nodes 108. If the object has not been already stored in the common objects 118 of the selected set of client nodes 108, the client node sends the object to the storage 114. If the object has already been stored in the common objects 118 of the selected set of client nodes 108, then a backup is performed for the client node, such as client node 106, but the client node does not have to resend the previously stored object.

Figure 2:
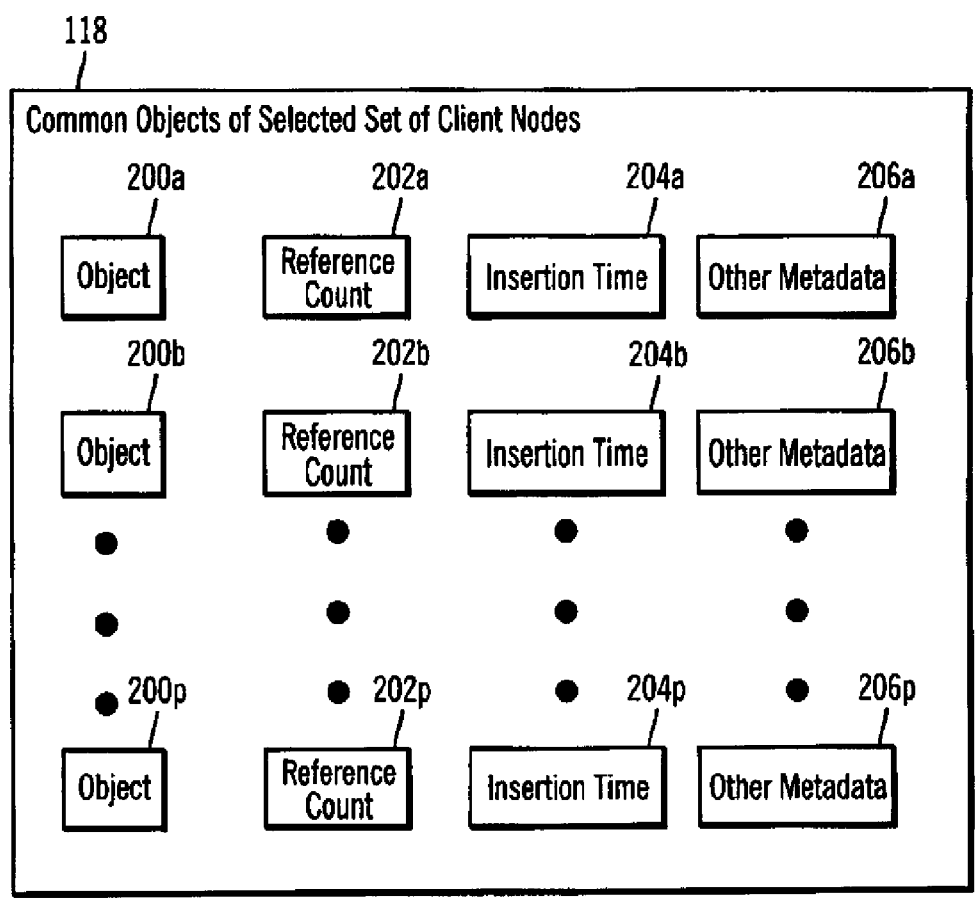
FIG. 2 illustrates a block diagram of common objects of a selected set of client nodes, in accordance with certain embodiments.

FIG. 2 illustrates a block diagram of common objects 118 of a selected set of client nodes implemented in the server 102, in accordance with certain embodiments.

The common objects of a selected set of client nodes may include a plurality of objects 200a, 200b, . . . , 200p, wherein in certain embodiments the objects 200a . . . 200p are files. The objects 200a . . . 200p may be the union of all objects found in the selected set of client nodes 108.

Associated with the objects 200a, 200b, . . . 200p, are indicators corresponding to reference counts 202a, 202b, . . . 202p, insertion times 204a, 204b, . . . 204p, and other metadata 206a, 206b, . . . 206p. For example, reference count 202a, insertion time 204a, and other metadata 206a are associated with object 200a.

A reference count indicates the number of client nodes of the selected set of client nodes 108 that have the corresponding object in common. For example, if client node 106a and client node 106b both share the object 200a stored in the common objects 118 of selected set of client nodes, then the reference count 202a for the object 200a may be two. The insertion time for an object is the time at which the object was inserted into the common objects 118 of the selected set of client nodes 108. For example, the insertion time 204a for object 200a may be "Mar. 11, 2005".

The other metadata 206a . . . 206p may include other descriptive information of the objects. Such information may indicate the name and size of the file, etc.

Certain embodiments may allow pointers that reference the objects 200a . . . 200p stored in the common objects 118 of selected set of client nodes. By using pointers the actual data of the objects 200a . . . 200p need to be stored only once in the common objects 118 of the selected set of client nodes 108.

The metadata that has been shown in association with the common objects 118 of the selected set of client nodes 108 may be stored in the database 112 along with the objects 200a . . . 200p or representations of the objects 200a . . . 200p. FIG. 2 provides a schematic illustration of the association of objects with corresponding metadata. The actual association of objects with corresponding metadata may be implemented differently by using other data structures.

Figure 3:
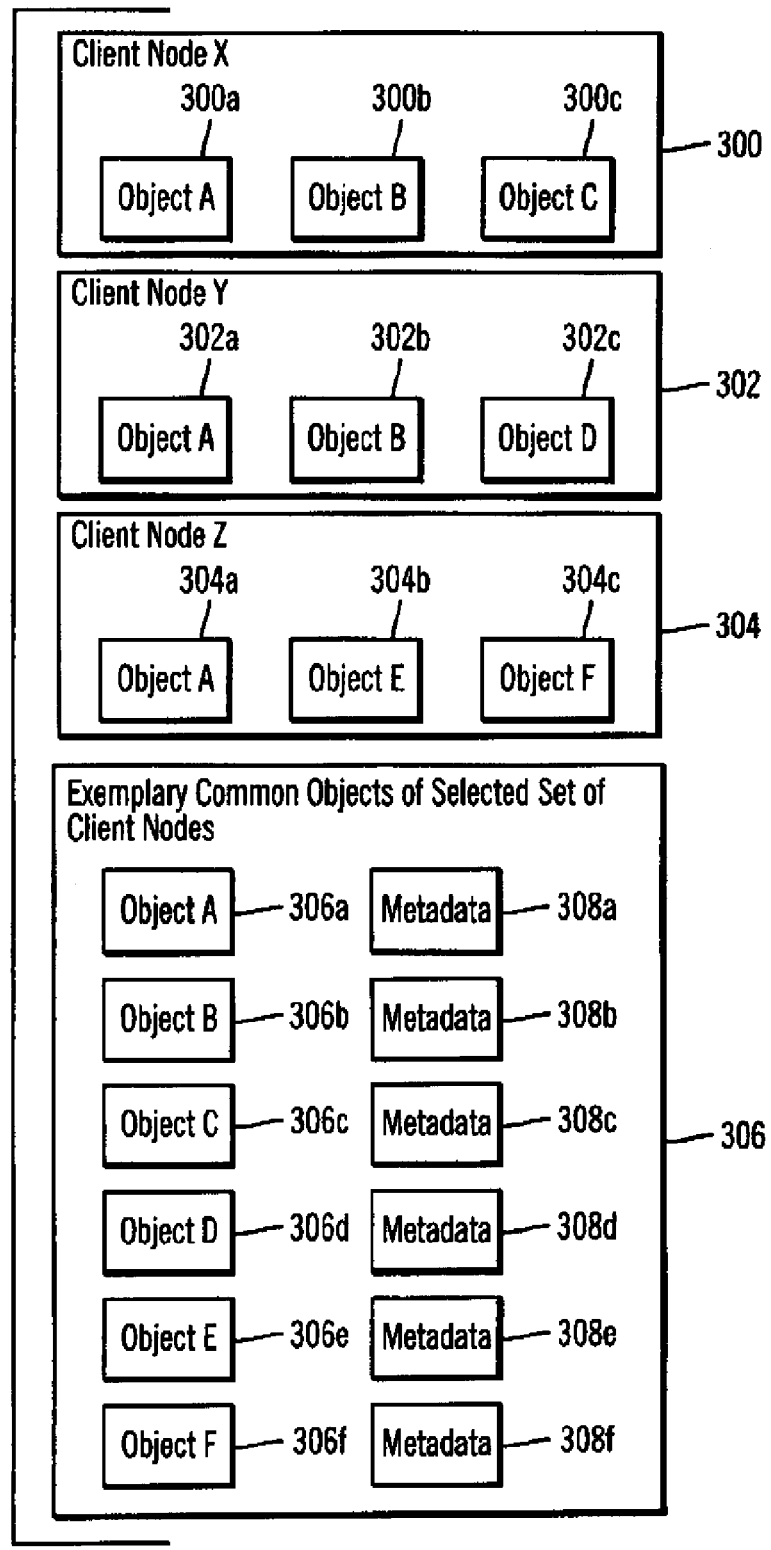
FIG. 3 illustrates block diagrams of exemplary common objects corresponding to exemplary client nodes, in accordance with certain embodiments.

FIG. 3 illustrates block diagrams of exemplary common objects corresponding to exemplary client nodes implemented in the computing environment 100, in accordance with certain embodiments.

In FIG. 3, an exemplary client node X 300 includes object A 300a, object B 300b and object C 300c, an exemplary client node Y 302 includes object A 302a, object B 302b, and object D 302c, and an exemplary client node Z 304 includes object A 304a, object E 304b, and object F 304c.

Based on client node X 300, client node Y 302, and client node Z 304 that form a selected set of client nodes, the exemplary common objects of the selected set of client nodes 306 may be generated by the storage management application 110.

The exemplary common objects of the selected set of client nodes 306 include objects A, B, C, D, E, F 306a, 306b, 306c, 306d, 306e, 306f and corresponding metadata 308a, 308b, 308c, 308d, 308e, 308f. Therefore, the exemplary common objects of the selected set of client nodes 306 may potentially be the union of all objects present in client node X 302, client node Y 304, and client node Z 306.

Figure 4:
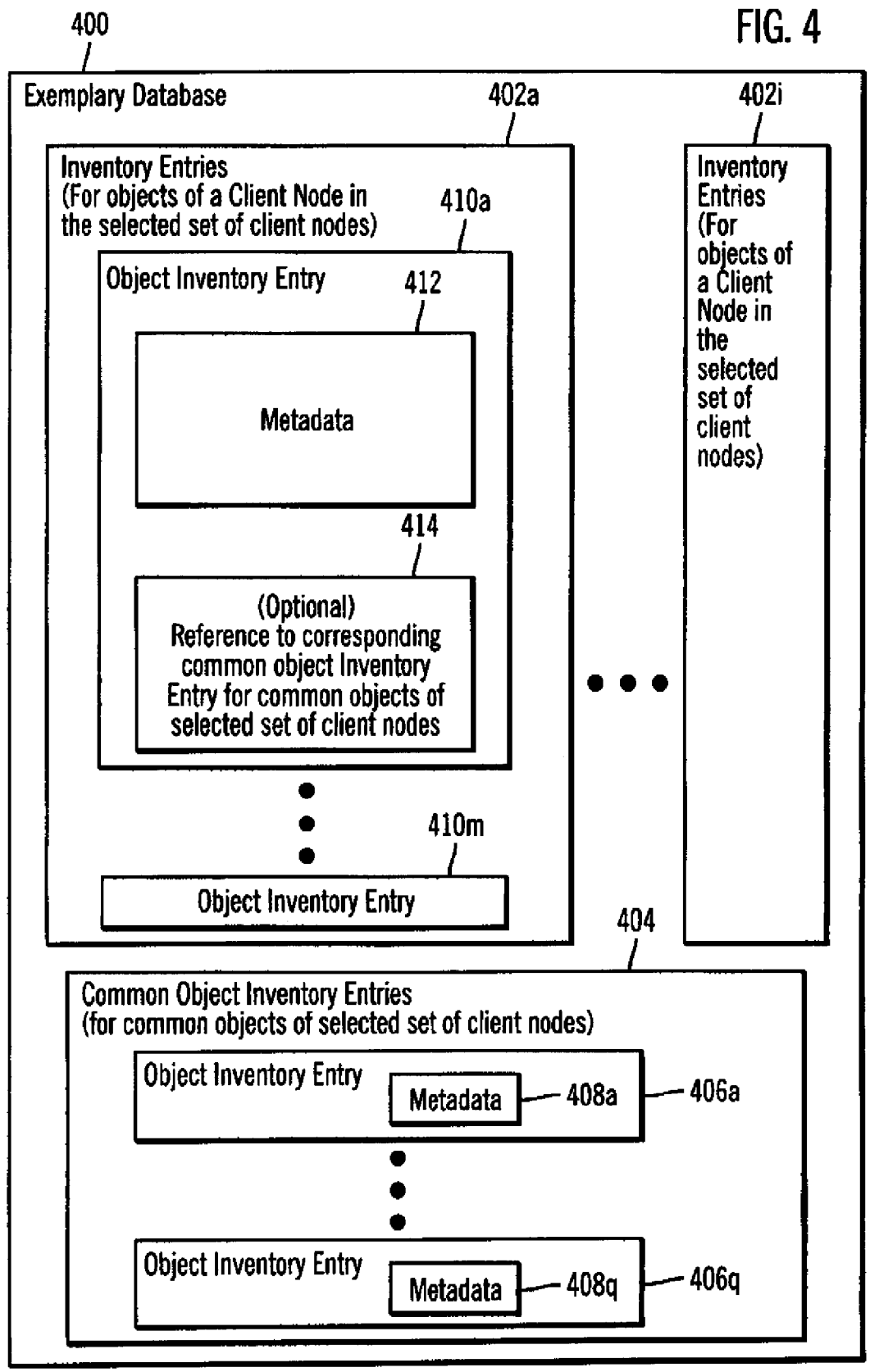
FIG. 4 illustrates an exemplary database for maintaining inventory entries for objects, in accordance with certain embodiments.

FIG. 4 illustrates an exemplary database 400 for maintaining inventory entries for objects, in accordance with certain embodiments. The exemplary database 400 may correspond to the database 112 implemented in the computing environment 100 of FIG. 1.

The exemplary database 400 may include inventory entries 402a . . . 402i for objects of the client nodes 106a . . . 106i. In FIG. 4, data structures of the inventory entries 402a for objects of the client node 106a are shown for illustration. In addition the exemplary database 400 may include data structures for common object inventory entries 404, where the common object inventory entries 404 are for the common objects 118 of the selected set of client nodes 108. The common object inventory entries 404 may include object inventory entries 406a . . . 406q corresponding to the common objects 118 of the selected set of client nodes 108, where the object inventory entries may include corresponding metadata, such as metadata 408a ... 408q.

The inventory entries 402a for client node 106a may include a plurality of object inventory entries 410a ... 410m corresponding to objects of the client node 106a. An exemplary object inventory entry 410a may include metadata 412 for the corresponding object, where the metadata 412 may include an active/inactive indicator that indicates whether the object is active or inactive for the client node 106a. The exemplary object inventory entry 410a may also include a time of object backup that indicates when the object was backed up for the client node 106a, where the time of object backup may be also be referred to as the insertion time 204a ... 204p. The time of object backup for a specific node may be different than that for other client nodes and may be different than the time at which the object was stored as a common object. Additionally, the exemplary object inventory entry 410a may also include an object management policy that indicates a policy by which the object is managed for the client node 106a, even though a different policy might be used for the same object on other client nodes. The exemplary object inventory entry 410a may also include security attributes for the object of the client node 106a, where the security attributes could be different for the same object on different client nodes. Certain other metadata discussed earlier, such as reference counts 202a ... 202p, insertion times 204a ... 204p may also be included.

In addition to the metadata 412, the object inventory entry 410a may also include a reference 414 to a corresponding object inventory entry in the common object inventory entries 404, if the object was backed up in the common objects 118 of the selected set of client nodes 108. The exemplary database 400 reduces redundancy of nodes by storing references 414 to corresponding object inventory entries for the model node, but at the same time allows for different attributes for the same object on different nodes by storing the attributes in the metadata 412.

The data structures shown in the exemplary database 400 are shown for illustration. In alternative embodiments, the exemplary database 400 may be structured differently. The metadata 412, 408a ... 408q, i.e., the metadata for both specific objects and common objects, may also include other information for each object, such as the name and size of the object in addition to the time the object was stored. In addition, in certain embodiments a table may be used to keep track of the actual client nodes that reference a common object.

Figure 5:
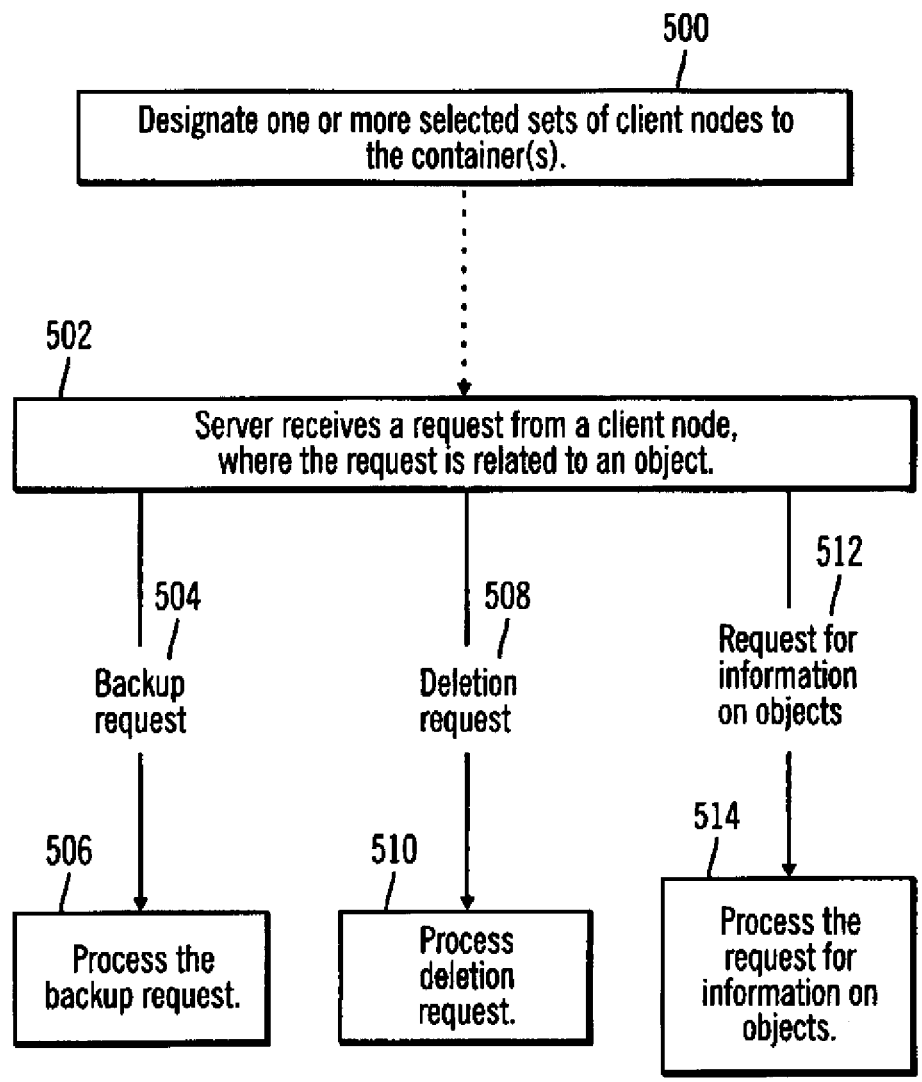
FIG. 5 illustrates a flowchart that shows the processing of backup, deletion, and information requests, in accordance with certain embodiments.

FIG. 5 illustrates a flowchart that shows the processing of backup, deletion, and information requests, in accordance with certain embodiments. The operations described in the flowchart for FIG. 5 may be implemented in the server 102 of the computing environment 100.

Control starts at block 500, where one or more selected sets of client nodes 108 are designated to the one or more containers 116 that represent the selected sets of client nodes in the server 102. In certain embodiments, the definition of the selected set of client nodes 108 could be performed by a command interface to the server 102. In other embodiments, the selected set of client nodes 108 represented by the one or more containers 116 may be dynamically created using business policies or other attributes defined for an enterprise. For example, the server 102 may derive the one or more containers 116 for machines of the same type, such as those having the same architecture and operating system, and for those end user client owners who belong in the same department or those end user client owners that are assigned to the same project. The server 102 may allow characteristics specific to the environment of the users to be considered while defining the client nodes to be designated to the one or more containers 116.

After the execution of block 500 control may proceed to block 502, where the server 102 receives a request from a client node, wherein the request is related to an object, such as a file. Block 502 need not be executed immediately after the execution of block 500. The lapse of time between the execution of block 500 and block 502 is indicated by a dashed line in FIG. 5.

The storage management application 110 on the server 102 may determine (at block 504) that the request is a backup request and then process (at block 506) the backup request. The storage management application 110 on the server 102 may also determine (at block 508) that the request is a deletion request for an object and process (at block 510) the deletion request. Furthermore, the storage management application 110 may determine (at block 512) that the request is for seeking information on objects stored in the server 102, and process (at block 514) the request for information on objects. Further details of blocks 506 and 510 are described in FIGS. 6 and 7 respectively.

Figure 6:
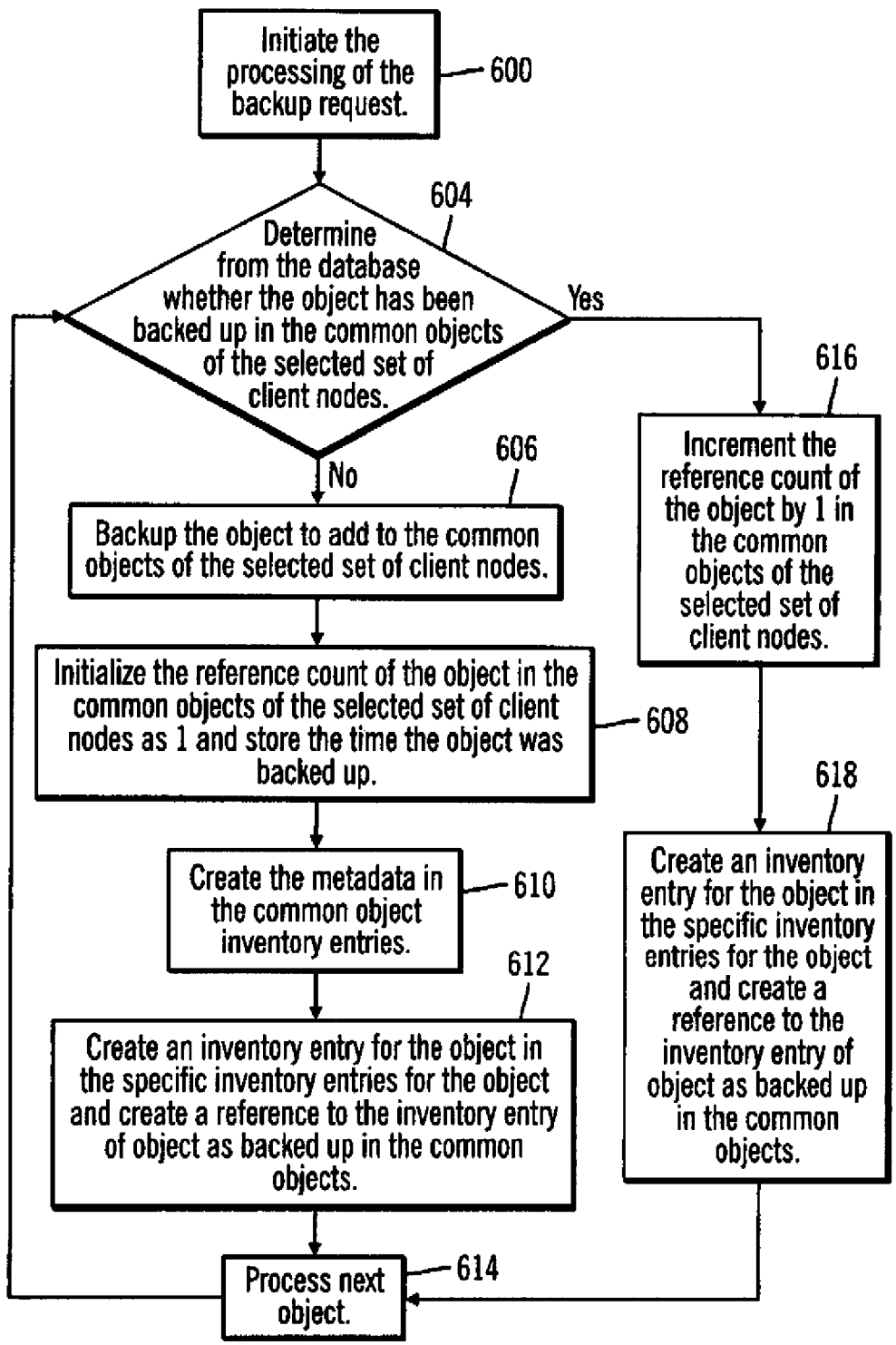
FIG. 6 illustrates a flowchart that shows the processing of backup requests, in accordance with certain embodiments.

FIG. 6 illustrates a flowchart that shows the processing of backup requests, in accordance with certain embodiments. The operations described in the flowchart for FIG. 6 may be implemented in the server 102 of the computing environment 100. The operations shown in FIG. 6 may in certain embodiments implement the operations described in block 506 of FIG. 5.

Control starts at block 600, where the storage management application 110 initiates the processing of the backup request 504 from a client node of the selected set of client nodes 108. At the time block 600 is performed a decision has already been made in the system as to which objects need to be backed up. This may be performed by comparing objects on the client node with metadata on the server to determine which objects needed to be backed up or via some other mechanism.

The storage management application 110 determines (at block 604) from the database 112 whether the object has been backed up in the common objects 118 of the selected set of client nodes 108. If not, then the object is a new object to be backed up and the storage management application 110 backs up (at block 606) the object to add to the common objects 118 of the selected set of client nodes 108.

The storage management application 110 initializes (at block 608) the reference count, such as one of the reference counts 202a ... 202p, of the object in the common objects 118 of the selected set of client nodes 108 as one and stores the time the object was backed up, in one of the entries labeled insertion time 204a ... 204p. The metadata in the common object inventory entries of the database 112 are created (at block 610). The storage management application 110 creates (at block 612) an inventory entry for the object in the specific inventory entry 120a ... 120i for the object and creates a reference to the inventory entry of object as backed up in the common objects 118 of selected set of client nodes. The inventory entries may be maintained in the database 112. Control proceeds to block 614 for processing the next object for backup and control returns to block 604. If there is no next object for backup in block 614, then the process exits.

If at block 604, the storage management application 110 determines from the database 112 that the object has been backed up in the common objects 118 of the selected set of client nodes 108, then the storage management application 110 increments (at block 616) the reference count, such as one of the reference counts 202a ... 202p, of the object by one, where the object is in the common objects 118 of the selected set of client nodes 108. The storage management application 110 creates (at block 618) an inventory entry for the object in the specific inventory entries 402a . . . 402i of the object and creates a reference 414 to the inventory entry of the object 406a . . . 406q as backed up in the common objects 118 of the selected set of client nodes 108. Control proceeds to process (at block 614) to process the next object, if any such object has to be backed up.

Therefore, FIG. 6 illustrates certain embodiments to backup objects in the server 102. If the object is a new object then the object may be backed up in the common objects 118 of the selected set of client nodes 108. If the object has already been stored in the common objects 118 of the selected set of client nodes 108, the object is not sent to the server 102 once again but inventory entries, reference counts, and other metadata are updated to reference the already stored object on the server. A reference count 202a . . . 202p that indicates the number of client nodes using a backed up common object is maintained.

Figure 7:
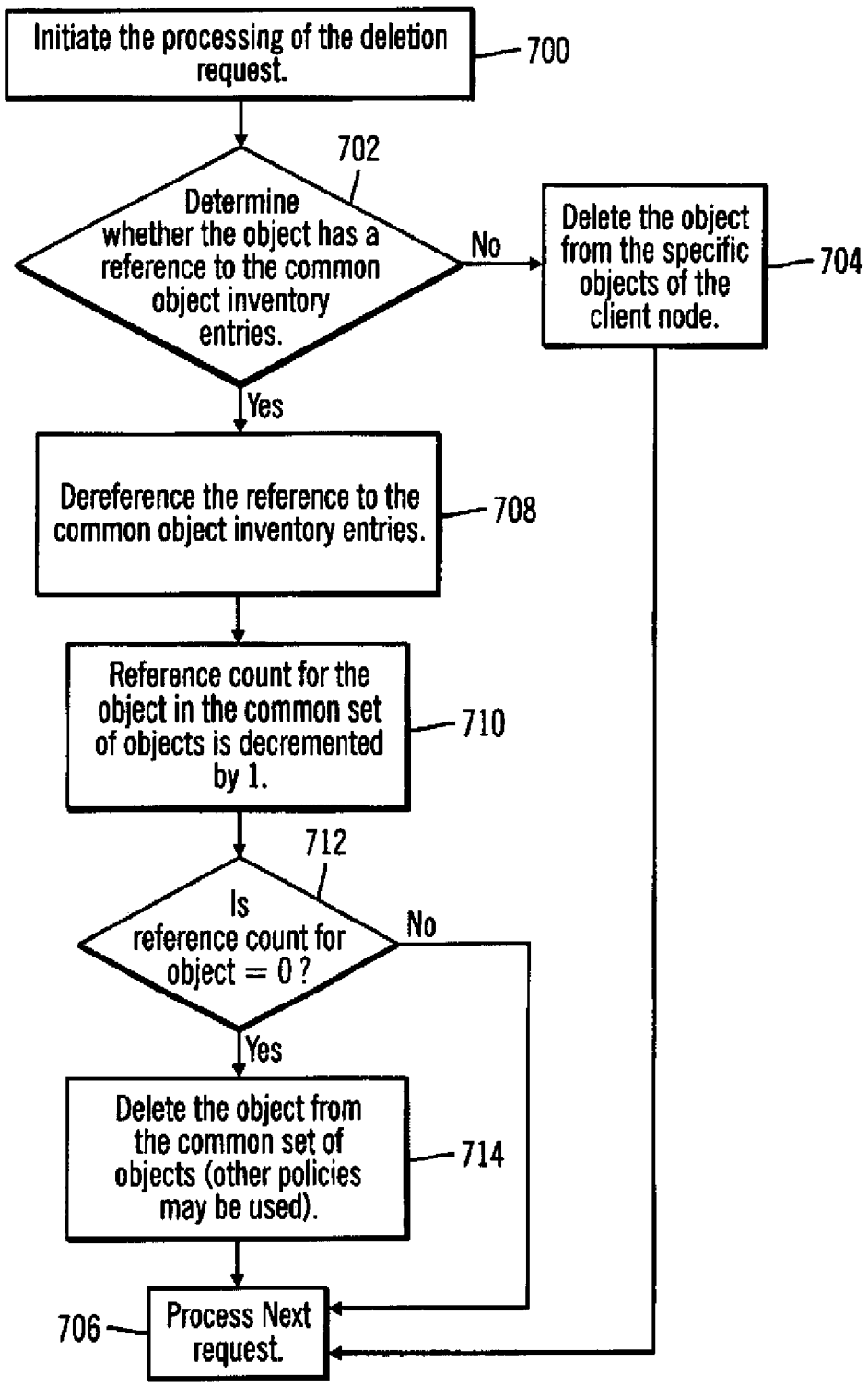
FIG. 7 illustrates a flowchart that shows the processing of deletion requests, in accordance with certain embodiments.

FIG. 7 illustrates a flowchart that shows the processing of deletion requests, in accordance with certain embodiments. The operations described in the flowchart for FIG. 7 may be implemented in the server 102 of the computing environment 100. The operations shown in FIG. 7 in certain embodiments implement the operations described in block 510 of FIG. 5.

Control starts at block 700, where the storage management application 110 initiates the processing of the deletion request 508 from a client node. The storage management application 110 determines (at block 702) whether the object to be deleted has a reference to the common object inventory entries 404. If not, then the object is not stored as a common object, and the storage management application 110 deletes (at block 704) the object from the specific objects of the client node 120a . . . 120i, and the next request is processed (at block 706).

If the storage management application 110 determines (at block 702) that the object to be deleted has a reference to the common object inventory entries 404, then the storage management application 110 dereferences (at block 708) the reference to the common object inventory entries 404, e.g., by updating the exemplary reference to corresponding common object inventory entry 414.

The storage management application 110 decrements (at block 710) the reference count 202a . . . 202p for the object in the common objects by one. The storage management application 110 determines (at block 712) whether the reference count for the object is zero. If so, then the object is no longer being used by any of the selected set of client nodes 108 and the storage management application 110 deletes (at block 714) the object from the common set of objects. In alternative embodiments, other policies may be used for deleting common objects. Control proceeds to block 706, where the storage management application 110 processes the next request.

If the storage management application 110 determines (at block 712) that the reference count for the object is not zero, then the object is being used by at least one of the selected set of client nodes 108 and the object is not deleted. Control proceeds to block 706, where the storage management application 110 processes the next request.

Therefore, FIG. 7 illustrates certain embodiments in which a common object stored in the common objects 118 of selected set of client nodes is deleted when the common object is no longer being used by any of the client nodes. In certain embodiments, the non-referenced file may be kept in the common objects 118 of the selected set of client nodes 108 for a period of time after the reference count goes to zero.

Figure 8:
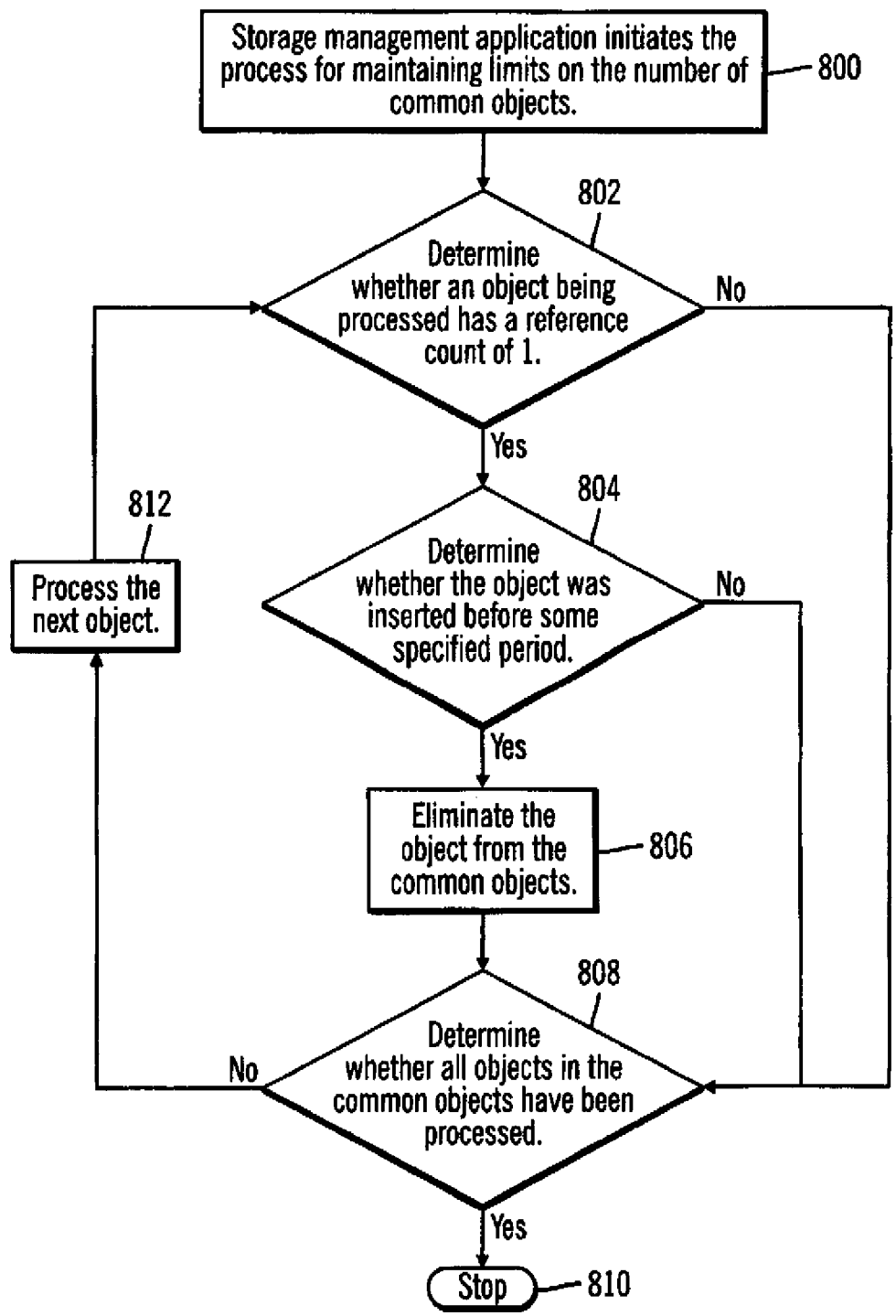
FIG. 8 illustrates a flowchart that shows how to maintain limits on the number of common objects, in accordance with certain embodiments.

FIG. 8 illustrates a flowchart that shows how to maintain limits on the number of common objects 118, in accordance with certain embodiments. The operations described in the flowchart for FIG. 8 may be implemented in the server 102 of the computing environment 100.

Control starts at block 800, where the storage management application 110 initiates the process for maintaining limits on the number of common objects 118 by processing the common objects 118 of the selected set of nodes one by one. If the number of common objects is not limited then the space requirements for storing the common objects 118 of the selected set of nodes may keep on increasing as new objects are added.

The storage management application 110 determines (at block 802) whether an object being processed has a reference count 202a . . . 202p of one. If so, then only one client node is using the common object and the storage management application 110 determines (at block 804) whether the object was inserted before some specified time period. If so, the storage management application 110 eliminates (at block 806) the object from the common objects 118 of the selected set of client nodes 108. However, the object is not removed from storage because there is still one specific object that references the eliminated common object. The database entries that show the object as a common object is removed and the specific object inventory for the object will now reference the object directly rather than showing the object as a common object. The storage management application 110 determines (at block 808) whether all objects in the common objects 118 of the selected set of client nodes 108 have been processed, If so, the process stops (block 810), and if not, the storage management application 110 processes (at block 812) the next object by returning control to block 802.

If at block 802, the storage management application 110 determines that the object being processed does not have a reference count of one, then control proceeds to block 808. Also, at block 804, if storage management application 110 determines that the object was not inserted before some specified period control proceeds to block 808.

Therefore, FIG. 8 illustrates certain embodiments in which a common object is deleted when the common object is being used by a single client node and the common object was inserted before some specified period. In alternative embodiments, other criteria may be used to limit the size of the common objects 118 of the selected set of client nodes 108.

Figure 9:
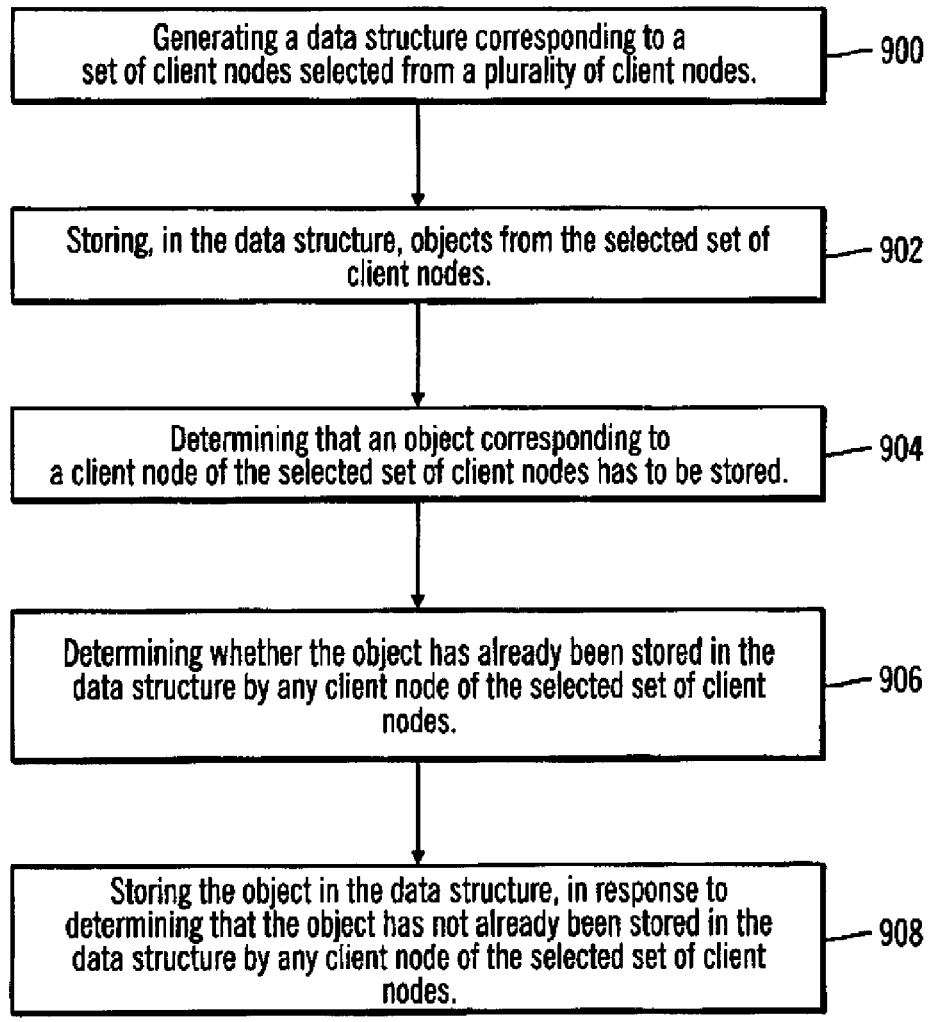
FIG. 9 illustrates a flowchart that shows the elimination of redundant objects for a selected set of client nodes, in accordance with certain embodiments.

FIG. 9 illustrates a flowchart that shows the elimination of redundant objects for a selected set of client nodes, in accordance with certain embodiments. The operations described in the flowchart for FIG. 9 may be implemented in the server 102 of the computing environment 100.

Control starts at block 900, wherein in certain embodiments a server node 102 generates a data structure corresponding to a set of client nodes 106a . . . 106i selected from a plurality of client nodes 106a . . . 106n. The data structure may include files, lists, arrays, records, trees, tables, or any other suitable data structure known in the art. The data structure is capable of storing data and may allow operations to be performed on the data. For example, in certain exemplary embodiments the generated data structure may include common objects 118 of the selected set of client nodes 108, a container 116, a database 112, etc.

The server node 102 stores (at block 902), in the data structure, objects from the selected set of client nodes 108. The server node 102 determines (at block 904) that an object corresponding to a client node of the selected set of client nodes 108 has to be stored. In alternative embodiments, the operations of block 904 may be performed by a client node.

The server node 102 determines (at block 906) whether the object has already been stored in the data structure by any client node of the selected set of client nodes 108. The server node 102 stores (at block 908) the object in the data structure, in response to determining that the object has not already been stored in the data structure by any client node of the selected set of client nodes 108. In certain embodiments, operations shown as being performed by the server node 102 may be performed by a client node.

In certain embodiments, the objects of a selected set of client nodes 108 may be stored in the server 102 as common objects 118. The selected set of client nodes 108 may send objects to the server node 102 if the objects have not already been stored as common objects 118. If the object has already been stored as common objects 118, a backup operation performed by a client node may reference the already stored common objects 118.

Certain embodiments may use the container 116 as an adaptive model node. The adaptive model node does not represent a single specific client node or the underlying client computer. The adaptive model node may be a namespace representing all the unique objects stored by all members of the selected set of client nodes 108, where the selected set of client nodes may be a model node group. The database 112 maintains information to track which objects are either referenced or owned by a given member of the model node group.

In certain alternative embodiments, the client nodes may be drives, mount points or directory levels and need not be computational platforms. Additionally certain embodiments may implement a hierarchy of selected sets of client nodes because the namespace for consideration for the elimination of redundant files then may become the union of the namespaces represented by each of the selected sets of client nodes in the hierarchy. In certain embodiments, the selected set of client nodes is a virtual client node, and may be used to dynamically manage and update objects.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 10:
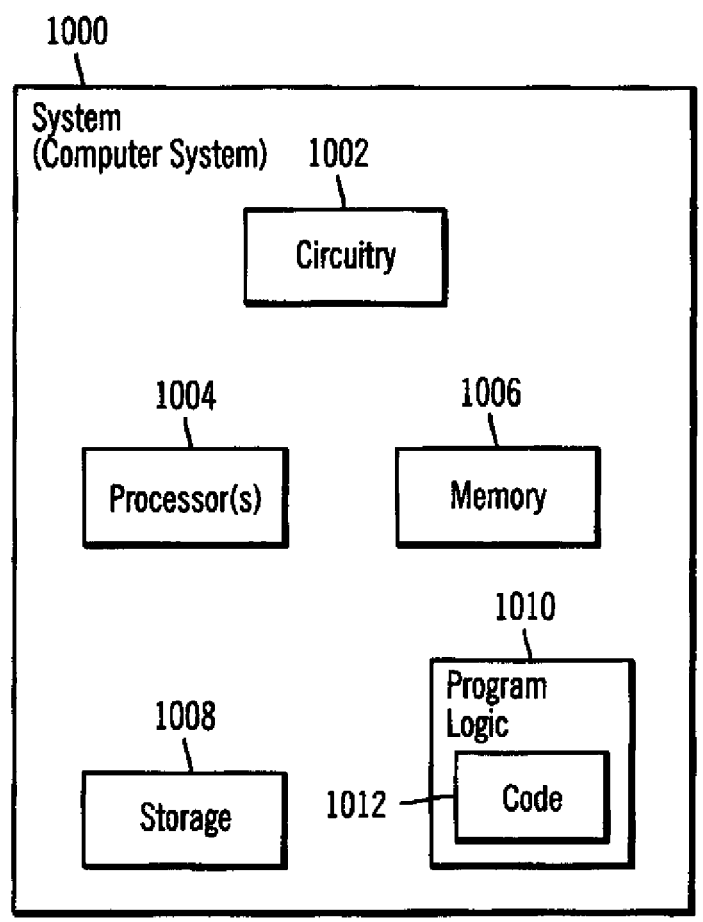
FIG. 10 illustrates the architecture of a computer system, wherein in certain embodiments the server and the clients of the computing environment of FIG. 1 may be implemented in accordance with the architecture of the computer system.

FIG. 10 illustrates the architecture of a computer system 1000, wherein in certain embodiments the server 102 and the clients 106a . . . 106n of the computing environment of FIG. 1 may be implemented in accordance with the architecture of the computer system. In certain embodiments, the computational platform shown in FIG. 1 such as the server 102 and the client nodes 106a . . . 106n may be implemented in accordance with the system 1000. The system 1000 may include a circuitry 1002 that may in certain embodiments include a processor 1004. The system 1000 may also include a memory 1006 (e.g., a volatile memory device), and storage 1008. Certain elements of the system 1000 may or may not be found in the server 102 and the client nodes 106a . . . 106n. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 5-9 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-10 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising:
   storing, in a data structure, common objects from a selected set of client nodes of a plurality of client nodes, wherein the common objects are shared by the selected set of client nodes, wherein insertion times for the common objects and a number of client nodes that share the common objects are stored;
   determining that an object corresponding to a client node of the selected set of client nodes has to be stored;
   storing the object in the data structure, in response to determining that the object has not already been stored in the data structure by any client node of the selected set of client nodes;
   initiating a process for maintaining limits on a number of common objects stored in the data structure; and
   eliminating one object from the data structure in response to determining that the one object in the data structure is referenced by only one client node and was stored prior to an insertion time.

2. The method of claim 1, wherein redundant files are eliminated by storing the common objects that are shared by the selected set of client nodes in the data structure.

3. The method of claim 1, the method further comprising:
   storing database entries for the common objects stored in the data structure, wherein the database entries include metadata corresponding to the common objects; and
   including in the metadata, the insertion times for the common objects and the number of client nodes that reference the common objects, wherein the number of common objects stored in the data structure is limited based on the insertion times for the common objects and the number of client nodes that share the common objects.

4. The method of claim 1, wherein the data structure is stored in a storage coupled to a server node, wherein the storage, the server node, and the plurality of client nodes are included in a storage area network.

5. The method of claim 1, further comprising:
   deploying computing infrastructure, comprising integrating computer-readable code into a computing system, wherein the computer-readable code in combination with the computing system performs:
   the storing of the common objects in the data structure;
   the determining that the object corresponding to the client node of the selected set of client nodes has to be stored; and
   the storing of the object in the data structure, in response to the determining that the object has not already been stored in the data structure by any client node of the selected set of client nodes.

6. The method of claim 5, wherein the integrating of the computer-readable code into the computing system is performed by storing the computer-readable code in the computing system in a networked computing environment.

7. The method of claim 1, wherein the one object is retained in the data structure at least as long as the one object is referenced by more than one client node.

8. A storage system coupled to a plurality of client nodes, the storage system comprising:
   a storage unit; and
   a server node including a memory, wherein the server node is coupled to the storage unit, the server node configured to perform operations, the operations comprising:
   storing, in a data structure in storage included in the storage unit, common objects from a selected set of client nodes of the plurality of client nodes, wherein the common objects are shared by the selected set of client nodes, wherein insertion times for the common objects and a number of client nodes that share the common objects are stored;

determining that an object corresponding to a client node of the selected set of client nodes has to be stored;

storing the object in the data structure, in response to determining that the object has not already been stored in the data structure by any client node of the selected set of client nodes;

initiating a process for maintaining limits on a number of common objects stored in the data structure; and eliminating one object from the data structure in response to determining that the one object in the data structure is referenced by only one client node and was stored prior to an insertion time.

9. The storage system of claim 8, wherein redundant files are eliminated by storing the common objects that are shared by the selected set of client nodes in the data structure.

10. The storage system of claim 8, the operations further comprising:

storing database entries for the common objects stored in the data structure, wherein the database entries include metadata corresponding to the common objects; and including in the metadata, the insertion times for the common objects and the number of client nodes that reference the common objects, wherein the number of common objects stored in the data structure is limited based on the insertion times for the common objects and the number of client nodes that share the common objects.

11. The storage system of claim 8, wherein the storage unit, the server node, and the plurality of client nodes are included in a storage area network.

12. The storage system of claim 8, wherein the one object is retained in the data structure at least as long as the one object is referenced by more than one client node.

13. A computer readable storage medium comprising at least one of a memory device, a magnetic storage device, and an optical storage device, wherein code stored in the computer readable storage medium when executed by a server node coupled to a storage and a plurality of client nodes performs operations, the operations comprising:

storing, in a data structure in the storage, common objects from a selected set of client nodes of the plurality of client nodes, wherein the common objects are shared by the selected set of client nodes, wherein insertion times for the common objects and a number of client nodes that share the common objects are stored;

determining that an object corresponding to a client node of the selected set of client nodes has to be stored;

storing the object in the data structure, in response to determining that the object has not already been stored in the data structure by any client node of the selected set of client nodes;

initiating a process for maintaining limits on a number of common objects stored in the data structure; and eliminating one object from the data structure in response to determining that the one object in the data structure is referenced by only one client node and was stored prior to an insertion time.

14. The computer readable storage medium of claim 13, wherein redundant files are eliminated by storing the common objects that are shared by the selected set of client nodes in the data structure.

15. The computer readable storage medium of claim 13, the operations further comprising:

storing database entries for the common objects stored in the data structure, wherein the database entries include metadata corresponding to the common objects; and including in the metadata, the insertion times for the common objects and the number of client nodes that reference the common objects, wherein the number of common objects stored in the data structure is limited based on the insertion times for the common objects and the number of client nodes that share the common objects.

16. The computer readable storage medium of claim 13, wherein the storage, the server node, and the plurality of client nodes are included in a storage area network.

17. The computer readable storage medium of claim 13, wherein the one object is retained in the data structure at least as long as the one object is referenced by more than one client node.

* * * * *